(12) United States Patent
Coutts et al.

(10) Patent No.: US 12,229,147 B1
(45) Date of Patent: Feb. 18, 2025

(54) DYNAMICALLY INSTANTIATED COMPLEX QUERY PROCESSING

(71) Applicant: Teradata US, Inc, San Diego, CA (US)

(72) Inventors: Michael G. Coutts, San Diego, CA (US); David Doyle Gilbreath, Escondido, CA (US); Douglas P. Brown, Rancho Santa Fe, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/620,019

(22) Filed: Mar. 28, 2024

Related U.S. Application Data

(60) Provisional application No. 63/616,725, filed on Dec. 31, 2023.

(51) Int. Cl.
*G06F 16/2455* (2019.01)
*G06F 16/25* (2019.01)

(52) U.S. Cl.
CPC ...... *G06F 16/24564* (2019.01); *G06F 16/254* (2019.01)

(58) Field of Classification Search
CPC .................. G06F 16/24564; G06F 16/254
See application file for complete search history.

(56) References Cited

U.S. PATENT DOCUMENTS

| | | | | |
|---|---|---|---|---|
| 8,392,404 B2 * | 3/2013 | Brown | ........... | G06F 16/217 |
| | | | | 707/719 |
| 8,688,629 B2 * | 4/2014 | Burger | ........... | G06F 9/505 |
| | | | | 707/812 |
| 8,812,537 B1 * | 8/2014 | Kapoor | ........... | G06F 16/256 |
| | | | | 707/769 |
| 9,589,017 B2 * | 3/2017 | Khanolkar | ....... | G06F 16/24542 |
| 9,805,121 B2 | 10/2017 | Brown et al. | | |
| 10,366,057 B2 | 7/2019 | Morris et al. | | |
| 11,243,819 B1 * | 2/2022 | Wagner | ........... | G06F 9/45558 |
| 11,853,807 B1 * | 12/2023 | Coult | ........... | G06F 9/5077 |
| 2006/0253472 A1 * | 11/2006 | Wasserman | ....... | G06Q 10/06 |
| 2013/0085984 A1 * | 4/2013 | Burger | ........... | G06F 16/24547 |
| | | | | 707/E17.016 |
| 2016/0188638 A1 * | 6/2016 | Tran | ........... | G06F 16/21 |
| | | | | 707/803 |
| 2018/0004575 A1 * | 1/2018 | Marriner | ........... | G06F 9/5077 |
| 2020/0026710 A1 * | 1/2020 | Przada | ........... | G06N 5/022 |
| 2021/0294658 A1 * | 9/2021 | Gonzalez | ........... | G06F 9/5022 |
| 2022/0374424 A1 * | 11/2022 | Seebach | ........... | G06F 16/248 |
| 2024/0221039 A1 * | 7/2024 | Burger | ........... | G06Q 30/0629 |

OTHER PUBLICATIONS

Wikipedia post on "Connection Pool", located at en.wikipedia.org/wiki/Connection_pool.
docs.teradata.com/r/Teradata-Studio-IDE-Plug-in-User-Guide/March-2017/Getting-Started-With-IDE/Teradata-Libraries/About-Query-Banding.

* cited by examiner

*Primary Examiner* — Jorge A Casanova
(74) *Attorney, Agent, or Firm* — Howard Speight

(57) ABSTRACT

A query is received. It is determined that the query does not fit a profile for a run-the-business set of queries, where the profile for the run-the-business set of queries excludes queries that are not routine parts of running a business and that do not require priority processing. The query is executed with a dynamically-created compute capacity that is not part of a compute capacity used to run the run-the-business set of queries.

20 Claims, 12 Drawing Sheets

DYNAMICALLY INSTANTIATED COMPLEX QUERY PROCESSING

CROSS-REFERENCE TO RELATED APPLICATIONS

This application claims the benefit of U.S. Provisional Patent Application No. 63/616,725, entitled "Dynamically Instantiated Complex Query Processing," filed on Dec. 31, 2023, which is incorporated by reference in its entirety.

BACKGROUND

As users of Analytic Database systems move from a fixed size On-Premises system (with a fixed Purchase cost and multi-year depreciation mentality) to a supposedly "Infinitely Expandable" Cloud-based Service Provider (CSP) environment, they have realized that cost management has moved from CapEx (Capital Expenditure-Depreciation) to OpEx (where they have an on-going monthly or annual bill for their usage of the CSP's equipment and an Annual Recurring Revenue (ARR) cost from their Software Vendor for the use of or consumption of their vendor's Intellectual Property (The Database Software). Given that, within a CSP, users are no longer locked into a fixed size environment, they can "right size" their environment to run their business as opposed to over provisioning to ensure that there is sufficient "space" always available to support their eventual maximum workload as well as to perform the basic work of Running the Business.

While this makes the Chief Financial Officer (CFO) very happy (just enough OpEx cost to "Run the Business") the Chief Marketing Officer (CMO), who has Citizen Business Intelligence practitioners and Full Data Scientists that want to execute Ad-Hoc queries, with potentially no "space" to do so. These Ad-Hoc users tend to run on their own schedule, do some work on a local laptop, come up with a "premise" (query) that they need to run against a larger Test Dataset or a full Production Dataset. However, the Chief Information Officer (CIO) does not want these "Random" scientists impacting the fully optimized production system that is there to "Run the Business" and the CFO does not want to have some fixed set of resources spun up doing nothing until these "Data Scientists" happen to need it.

The problem is how to manage the minimal "Run the Business" capability which may in and of itself be "Tracking the Sun" (a US based retailer essentially powers up their BI and tactical operations workload at 8 am Eastern through until 8 pm Pacific, while having export, load, transform/export, transform, load (ELT/ETL) processes running overnight but at a lower level), while allowing the Ad-Hoc "Complex Data Science Queries" some space to operate while noting that this work may only add up to a subset of the working day and come at random points in that day (for example four half-hour queries executed throughout the day, which would be expensive if compute capacity (or "compute") and input/output (IO) had to be reserved in advance for this work). Supporting Ad-Hoc "Data Science" work that is designed to further build the business (identify future analytic queries that can enhance the business and include them in the operational system) while maintaining the "Run The Business" capability is a challenge.

SUMMARY

In one aspect, a method includes executing a plurality of processes on a plurality of compute groups. Each compute group includes one or more compute clusters. Each compute cluster includes one or more nodes. Each node includes at least one computer processor and a memory. The plurality of processes store data on a data storage. A database system executes as at least one of the plurality of processes. The database system is configured to issue executable steps to at least one of the processes executing as part of the database system. The method includes receiving a query. The method includes determining that the query does not fit a profile for a run-the-business set of queries, where the profile for the run-the-business set of queries excludes queries that are not routine parts of running a business and that do not require priority processing. The method includes executing the query with a dynamically-created compute capacity that is not part of a compute capacity used to run the run-the-business set of queries.

Implementations may include one or more of the following. The dynamically-created compute capacity may exist when the query is received. The dynamically-created compute capacity may exist as part of a capacity pool when the query is received. The dynamically-created compute capacity may be instantiated at the time it is determined to run the dynamically-created compute capability. Determining that the query is not a query that is included in the run-the-business set of queries includes considering one or more of: if the query is tactical, in which case the query may be considered to be in the run-the-business set of queries, if the query has query metadata (query band) that explicitly indicates the query is tactical, in which case the query may be considered to be in the run-the-business set of queries, if the query is a decision support query or a business report query, in which case the query may be considered to be in the run-the-business set of queries, and if the query is an export, load, and transform query or an export, transform, load query, in which case the query may be considered to be in the run-the-business set of queries. Executing the query with a dynamically-created compute capacity may include identifying steps to be performed in executing the query and identifying a data-gathering subset of the steps that are focused on gathering data and a compute subset of the steps that perform analysis of the gathered data and executing the data-gathering subset of the steps on a first dynamically-created compute capacity, and executing the compute subset of the steps on a second compute capacity. The second compute capability may be a second dynamically-created compute capacity.

In one aspect, a computer program is recorded on a non-transitory computer-readable tangible medium. The computer program includes executable instructions, that, when executed, perform a method. The method includes executing a plurality of processes on a plurality of compute groups. Each compute group includes one or more compute clusters. Each compute cluster includes one or more nodes. Each node includes at least one computer processor and a memory. The plurality of processes store data on a data storage. A database system executes as at least one of the plurality of processes. The database system is configured to issue executable steps to at least one of the processes executing as part of the database system. The method includes receiving a query. The method includes determining that the query does not fit a profile for a run-the-business set of queries, where the profile for the run-the-business set of queries excludes queries that are not routine parts of running a business and that do not require priority processing. The method includes executing the query with a dynamically-created compute capacity that is not part of a compute capacity used to run the run-the-business set of queries.

In one aspect an article of manufacture includes a system executing a plurality of processes on a plurality of compute groups. Each compute group includes one or more compute clusters. Each compute cluster includes one or more nodes. Each node includes at least one computer processor and a memory. The plurality of processes store data on a data storage. A database system executes as at least one of the plurality of processes. The database system is configured to issue executable steps to at least one of the processes executing as part of the database system. The method includes the database system receiving a query. The method includes the database system determining that the query does not fit a profile for a run-the-business set of queries, where the profile for the run-the-business set of queries excludes queries that are not routine parts of running a business and that do not require priority processing. The method includes the database system executing the query with a dynamically-created compute capacity that is not part of a compute capacity used to run the run-the-business set of queries.

DETAILED DESCRIPTION (Note: This application references a number of different publications as indicated throughout the specification by one or more reference numbers within brackets [x]. A list of these publications ordered according to these reference numbers can be found below in the section entitled "References." The Reference section may also list some publications that are not explicitly referenced in this application. Each of these publications, including those that are not explicitly referenced, is incorporated by reference herein.)

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

An Example Computer System

Figure 1:
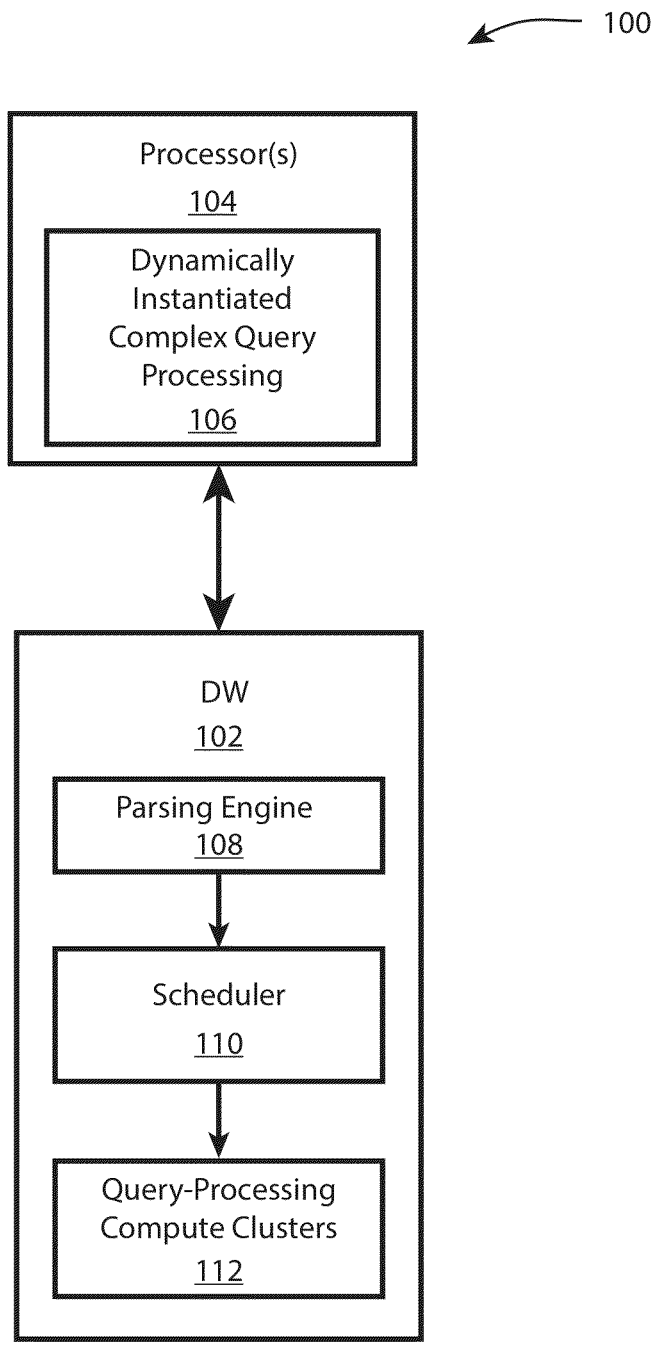
FIG. 1 is one example of a block diagram of a computer system.

The techniques disclosed herein have particular application to, but are not limited to, systems such as the system 100 illustrated in FIG. 1. The system 100 includes a variety of hardware components and software components that may be deployed on an appliance, on commodity hardware, in a private cloud, in a public cloud, in a combination of public and private clouds, and/or in a multi-cloud where cloud users are allowed services from multiple cloud vendors such as Amazon (AWS), Google (GCP), Microsoft (Azure), etc. The software components are programmed as executable instructions into memory and/or a non-transitory computer-readable medium for execution on the hardware components (including, for example, hardware processors). System 100 includes one or more network connections; the networks can be wired, wireless, or a combination of wired and wireless.

The system 100 implements, among other things, the processing described below in connection with FIGS. 1-14.

An Example Database Management System

The system 100 includes a data warehouse (DW) 102, at least one hardware processor 104, and a non-transitory computer-readable storage medium having executable instructions representing techniques for dynamically instantiated complex query processing 106, as disclosed herein. The DW 102 may be a distributed data system, such as VantageCloud Lake™ offered by Teradata Corporation.

The DW 102 may be a relational DW (RDW) or it may be another variety of database management system. The DW 102 may include a parsing engine 108, discussed below in connection with FIGS. 2 and 3, that organizes the storage of data and the distribution of database table rows and coordinates the retrieval of data from the data-storage facilities in response to queries received from a user. The DW 100 usually receives queries and commands to build tables in a standard format, such as Structured Query Language (SQL), or similar structured or unstructured languages including natural languages. The DW 102 also includes a scheduler 110 that makes decisions about when (i.e., immediately or delayed) and where executable steps to process a query are to be executed. The DW 102 also includes query-processing compute clusters 112, that process the query and produce a result. The compute clusters 112, described in more detail below, provide the ability to scale the DW 102. In a data lake system, such as DW 102, the data may not necessarily be managed by the same company that provides the primary cluster (discussed below), but the data can be anywhere and can be managed by anyone. The data can be processed as long as it is accessible via, for example, network or Internet connections.

Figure 2:
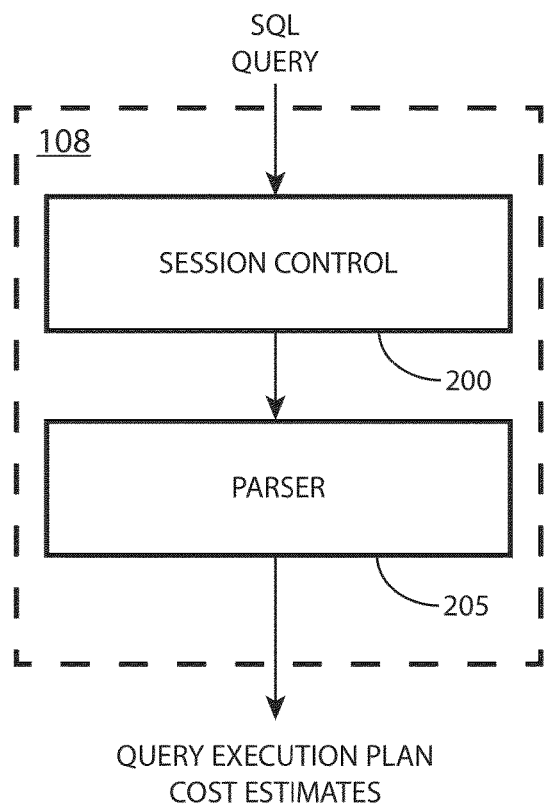
FIG. 2 is one example of a block diagram of a parsing engine.

The parsing engine, shown in FIG. 2, includes a session control 200 that allows a session to begin and a user to submit a SQL query. For the purposes of this document, the term "query" (or "request") refers to any statement, whether in SQL or a similar structured or unstructured language, that (1) causes data to be read from a database, such as DW 102, including cases where that read may be part of a larger write statement, where that data may be processed by the DW to produce an output result, and/or (2) instigates other DW actions, such as load utilities to load data from a source to a target, etc., including any background tasks necessary to produce the output result. More broadly, the user may submit a "request," a term that includes database query, which is processed by the DW to produce an output result, and other DW actions, such as load utilities to load data from a source to a target, etc. Typically, a query includes one or more predicates. Query predicates, or logical predicates, are types of conditional expressions that specify a condition of a row or group of rows that has one of three possible states: TRUE, FALSE, or NULL (or unknown).

Figure 3:
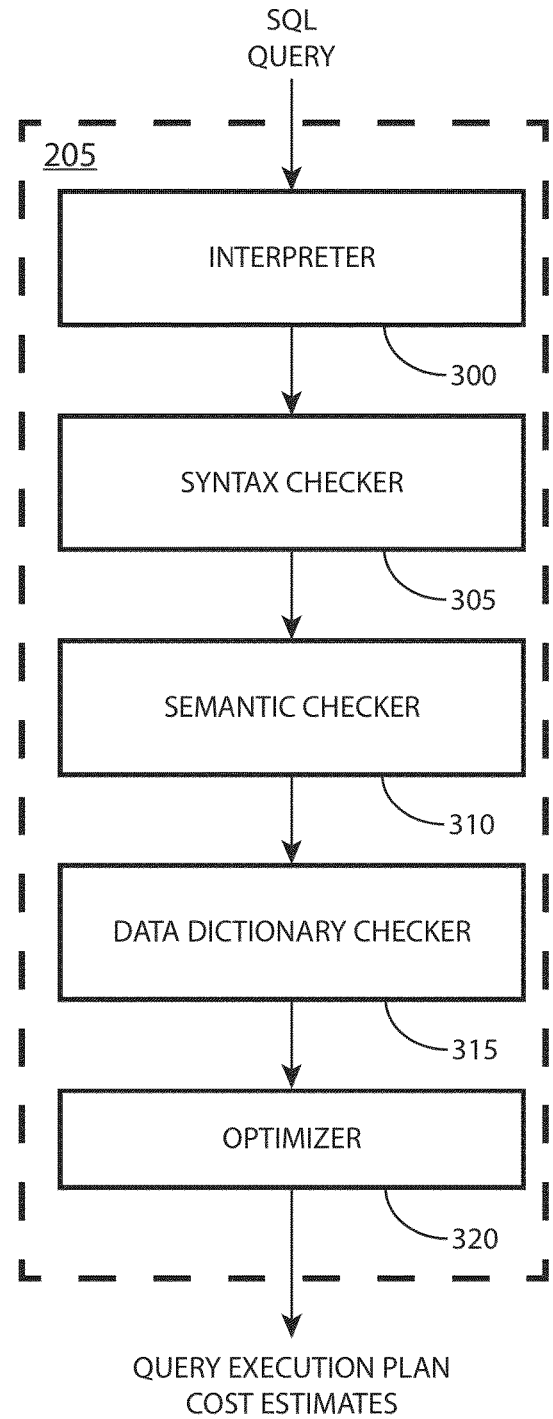
FIG. 3 is one example of a block diagram of a parser.

The SQL query is routed to the parser 205. As illustrated in FIG. 3, the parser 205 interprets the SQL query 300, checks it for proper SQL syntax 305, evaluates it semantically 310, and consults a data dictionary to ensure that all the objects specified in the SQL query actually exist and that the user has the authority to perform the request 315. Finally, the parser 205 runs an optimizer 320, which develops a query execution plan (QEP) to perform the query and produces cost estimates, where the term "cost" in this context has different dimensions, namely time, resource usage, and financial.

Returning to FIG. 1, the scheduler 110 produces executable steps to process the query. These executable steps are sent to query-processing compute clusters 112 (compute clusters are discussed below) for execution.

A "workload group" (or alternatively "workload") is a set of requests that have common characteristics, such as an application that issued the requests, a source of the requests, type of query, priority, response time goals, throughput, etc. A workload group is defined by a workload definition (WD), which defines characteristics of the workload group as well as various rules associated with the workload group.

"Query banding" allows users to attach metadata to queries. [4]

An Example Cloud-Based Processing System

Figure 4:
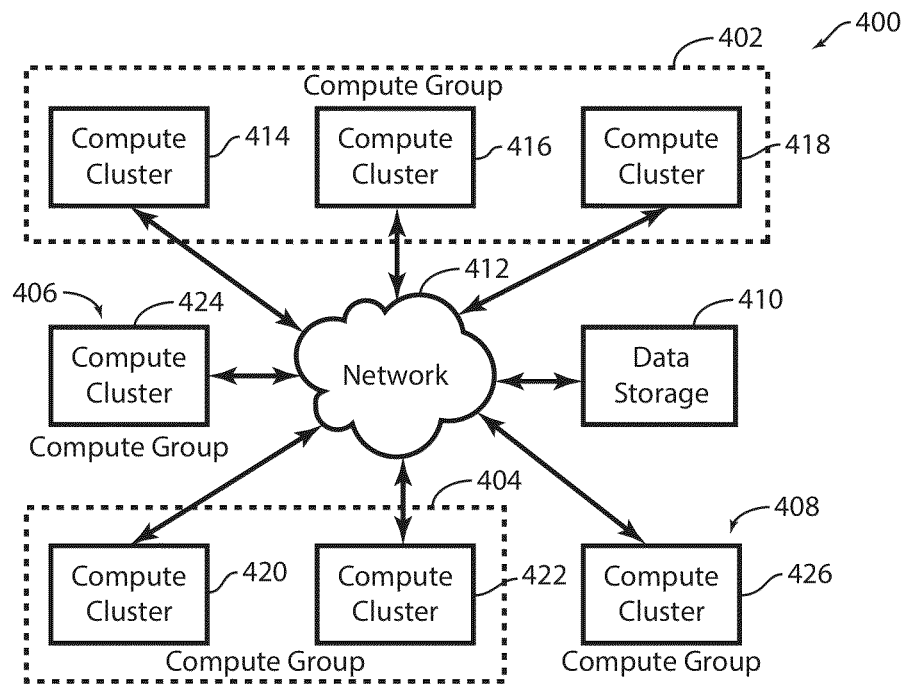
FIG. 4 illustrates a cloud-based processing system.

FIG. 4 illustrates a cloud-based processing system. A cloud-based processing system 400 includes one or more compute groups 402, 404, 406, 408 that communicate with a data storage 410 through a network 412. A compute group is defined as a collection of one or more compute clusters (discussed below in connection with FIG. 5). A compute group's usage may be designated for a particular department or application of an enterprise. For example:
- compute group 402, which might be dedicated to the enterprise's Sales department, includes compute clusters 414, 416, and 418,
- compute group 404, which might be dedicated to the enterprise's market-research application, includes compute clusters 420 and 422,
- compute group 406, which might be dedicated to the enterprise's Security department, includes compute cluster 424, and
- compute group 408, which might be dedicated to the enterprise's Engineering department, includes compute cluster 426.

Alternatively, a compute group may be used by multiple departments within an enterprise or by multiple enterprises.

Data storage 410 may include cloud-based object storage, such as Amazon Simple Storage Service (S3) or the Azure Blob Storage, or it may be a data storage system local to the enterprise or a combination of local and cloud-based storage.

Figure 5:
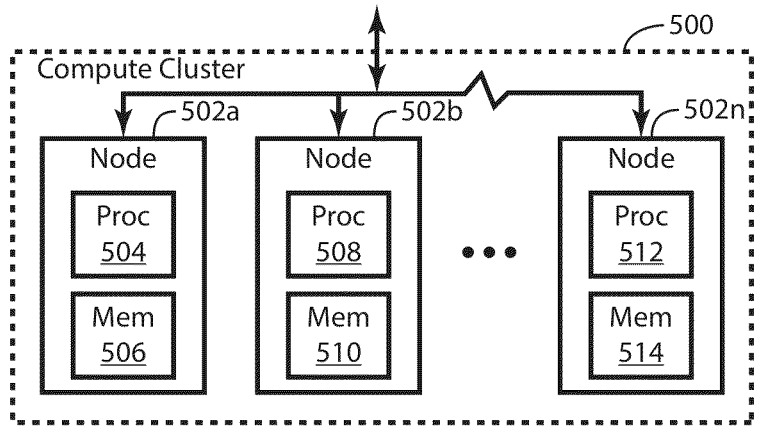
FIG. 5 illustrates a compute cluster.

FIG. 5 illustrates a compute cluster. A compute cluster 500 may be a complete full-featured database, such as that provided by Teradata Corporation, able to process queries. Each compute cluster 500 includes one or more nodes 502a, 502b, . . . , 502n. Each node includes a processor and memory. For example:
- node 502a includes processor 504 and memory 506,
- node 502b includes processor 508 and memory 510, and
- node 502n includes processor 512 and memory 514.

Each node 502a, 502b, . . . , 502n may be local to the enterprise or it may be cloud based. If cloud based, the processor and memory may be any of the processor/memory configurations offered by the cloud provider.

Compute groups, compute clusters, nodes, and processors are all "compute capacities."

Run-The-Business Architecture

Figure 6:
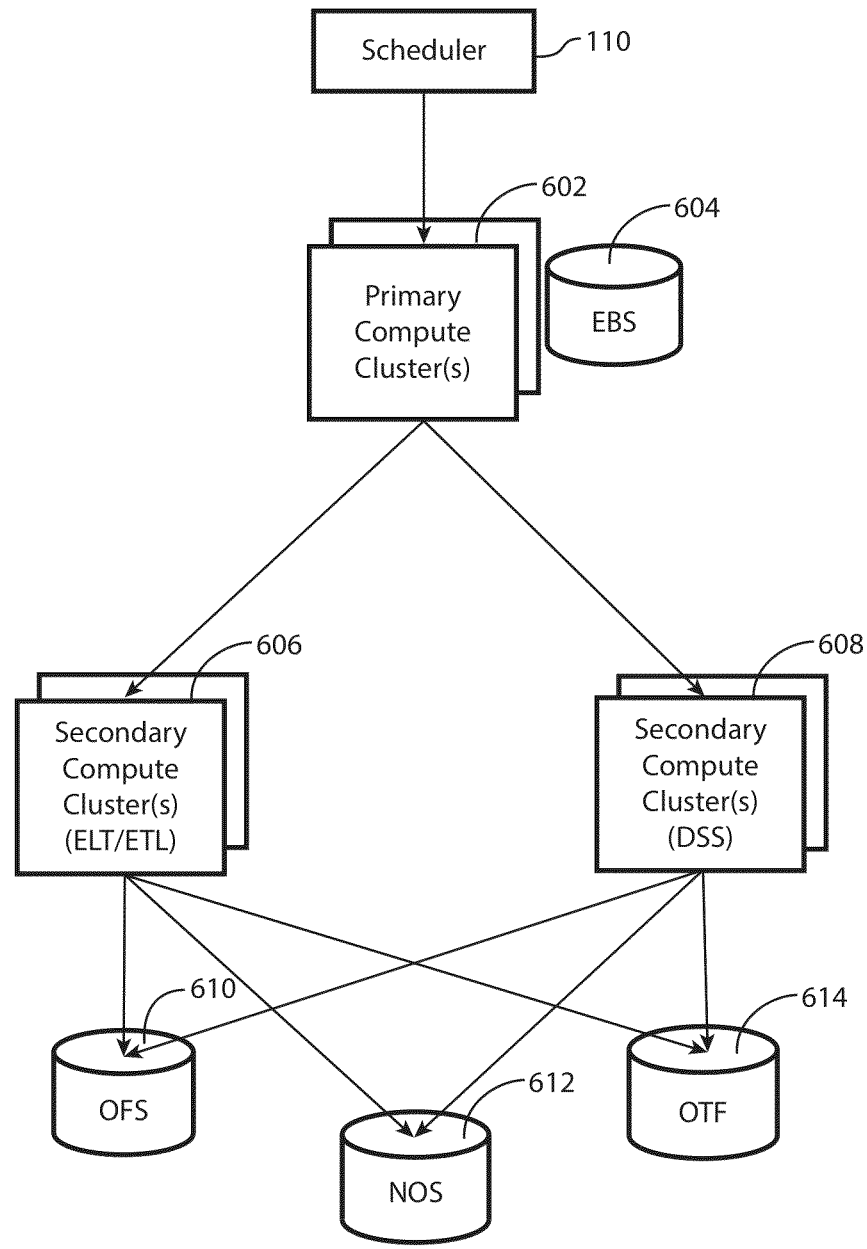
FIG. 6 is an illustration of a Run-The-Business architecture of an enterprise's data warehouse.

FIG. 6 is an illustration of a Run-The-Business architecture of an enterprise's data warehouse system. A Run-The-Business architecture provides the computing resources needed to process the enterprise's normal day-to-day processing load. Typically, such a day-to-day processing load includes tactical workloads, which may be handled by the Primary Compute Cluster(s) 602, while more complex queries may be routed to the Secondary Compute Cluster(s) 606, 608. The example shown in FIG. 6 is a typical block diagram of a CloudLake tenant in a VantageCloud Lake™ database environment provided by Teradata Corporation.

The major components of the CloudLake tenant in the VantageCloud Lake™ database environment, which is a special case of the cloud-based processing system illustrated in FIG. 4, include:
- Primary Compute Cluster(s) 602, which forms the hub of the system environment housed on a cluster such as that illustrated in FIG. 5 and provides much of the functionality illustrated in FIGS. 1-3, i.e., acting as a "brain" to maintain persistent user data, to receive queries or query steps from the scheduler 110 (note the scheduler 110 may not be part of the CloudLake tenant), to distribute query processing to Secondary Compute Cluster(s) 606, 608 (discussed below), and to perform its own database processing, especially for tactical queries based off local storage 604, sometimes referred to as Elastic Block Storage (EBS), that have time-based service level agreements (SLAs); the Primary Compute Cluster(s) 602 is housed on a compute cluster such as illustrated in FIG. 5
- optional Secondary Compute Cluster(s) 606, 608, which are independent compute resources used to offload compute-intensive query steps from the Primary Compute Cluster(s) 602, that are scalable and can come and go as load varies; some Secondary Compute Cluster(s) 606 may be primarily devoted to ELT/ETL workloads and some of the Secondary Compute Cluster(s) 608 may be primarily devoted to Decision Support (DSS) workloads; each of the Secondary Compute Cluster(s) 606, 608 is housed on a compute cluster such as illustrated in FIG. 5, Object Stores including Object File System (OFS) 610, Native Object System (NOS) 612, and Open Table Format (OTF) 614. The OFS 610 stores and manages data in an unstructured format called objects. Modern organizations create and analyze large volumes of unstructured data such as photos, videos, email, web pages, sensor data, and audio files. Cloud object storage systems distribute this data across multiple physical devices but allow users to access the content efficiently from a single, virtual storage repository. Object storage solutions are ideal for building cloud native applications that require scale and flexibility, and can also be used to import existing data stores for analytics, backup, or archive. The NOS 612 is a Teradata Vantage feature that allows querying data stored in files in object storage such as AWS S3, Google GCS, Azure Blob without building a data pipeline to bring it into Vantage. OTF 614 overlays a table format on groups of files in a data lake, allowing those groups to be treated as a single table.

a parallel, scalable network connection, represented by the lines between the elements in FIG. 6, that provides connectivity among the Primary Compute Cluster(s) 602, the Secondary Compute Cluster(s) 606, 608 and OFS 610, NOS 612, and/or OTF 614.

Figure 7:
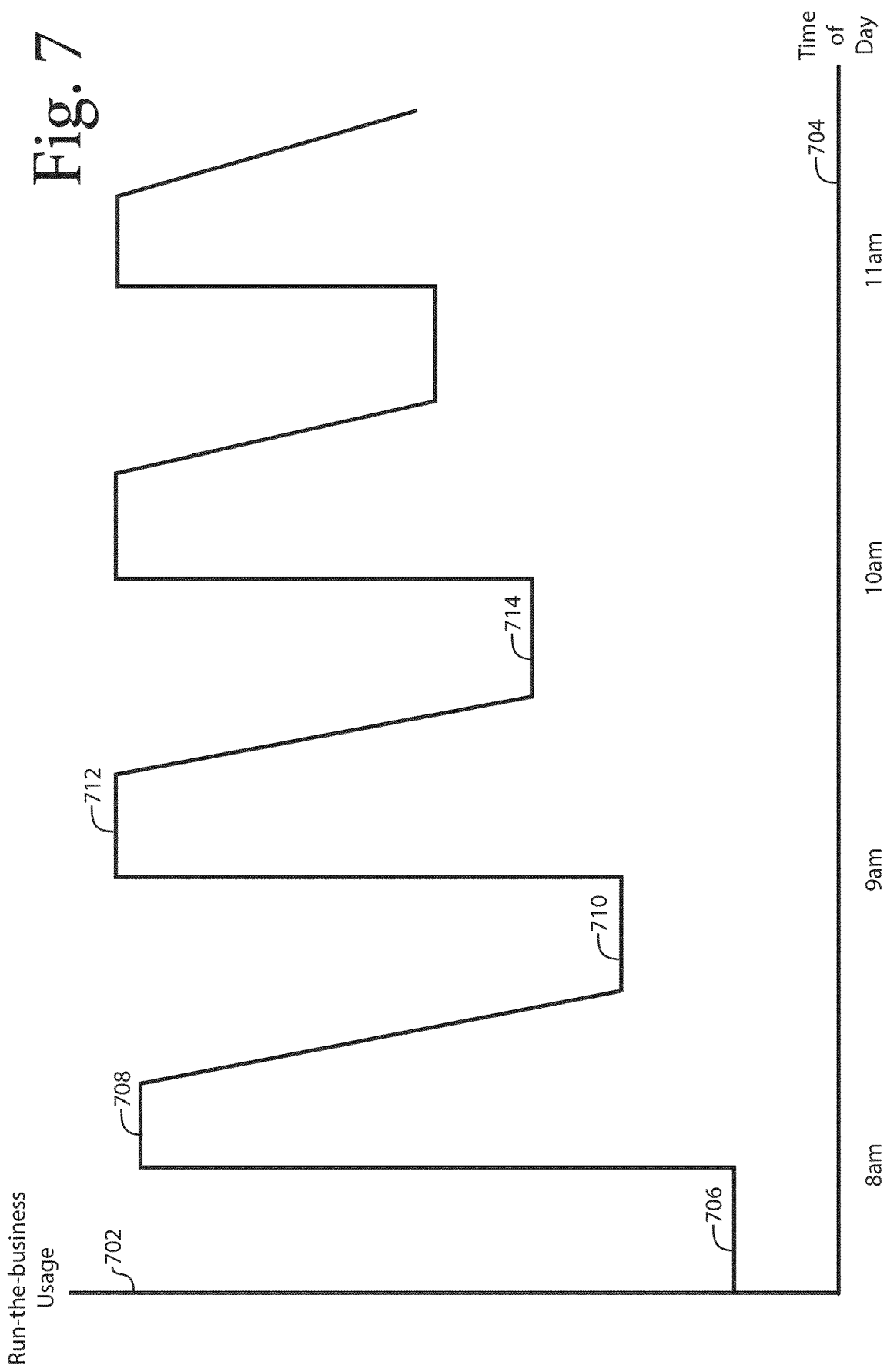
FIG. 7 illustrates an example of "Run the Business" usage of a highly optimized enterprise data warehouse of, for example, a continental wide retail chain whose physical stores open at 8 am in each of the continental time zones.

FIG. 7 illustrates an example of "Run The Business" usage of a highly optimized enterprise data warehouse of, for example, a continental wide retail chain whose physical stores open at 8 am in each of the continental time zones. The vertical axis 702 represents "Run The Business" usage of the system and the horizontal axis 704 represents time. Prior to the east coast stores opening at 8 am there is likely to be some level of usage 706 typically background ELT/ETL. At around the 8 am opening time there is a spike in usage 708 as managers run reports (also known as Decision Support or DSS) to look at the previous day's sales or current inventory levels. Over time the usage will settle at a higher level 710 than the early morning level 706 that includes the base ELT/ETL 706 usage along with tactical work as customers purchase items throughout the east coast stores. When the next time zone reaches 8 am (indicated as 9 am Eastern in FIG. 7) there is again a spike in DSS activity 712 as the managers in those newly opened stores run their morning reports. Again, over time usage will settle at a higher level than before 714 as two time zones worth of stores are now operating. This process will repeat as each subsequent time zone across the continent is reached.

A "Run The Business" set of queries, such as those described in the preceding paragraph, excludes queries that are not routinely used in running a business or that do not require priority processing.

Figure 8:
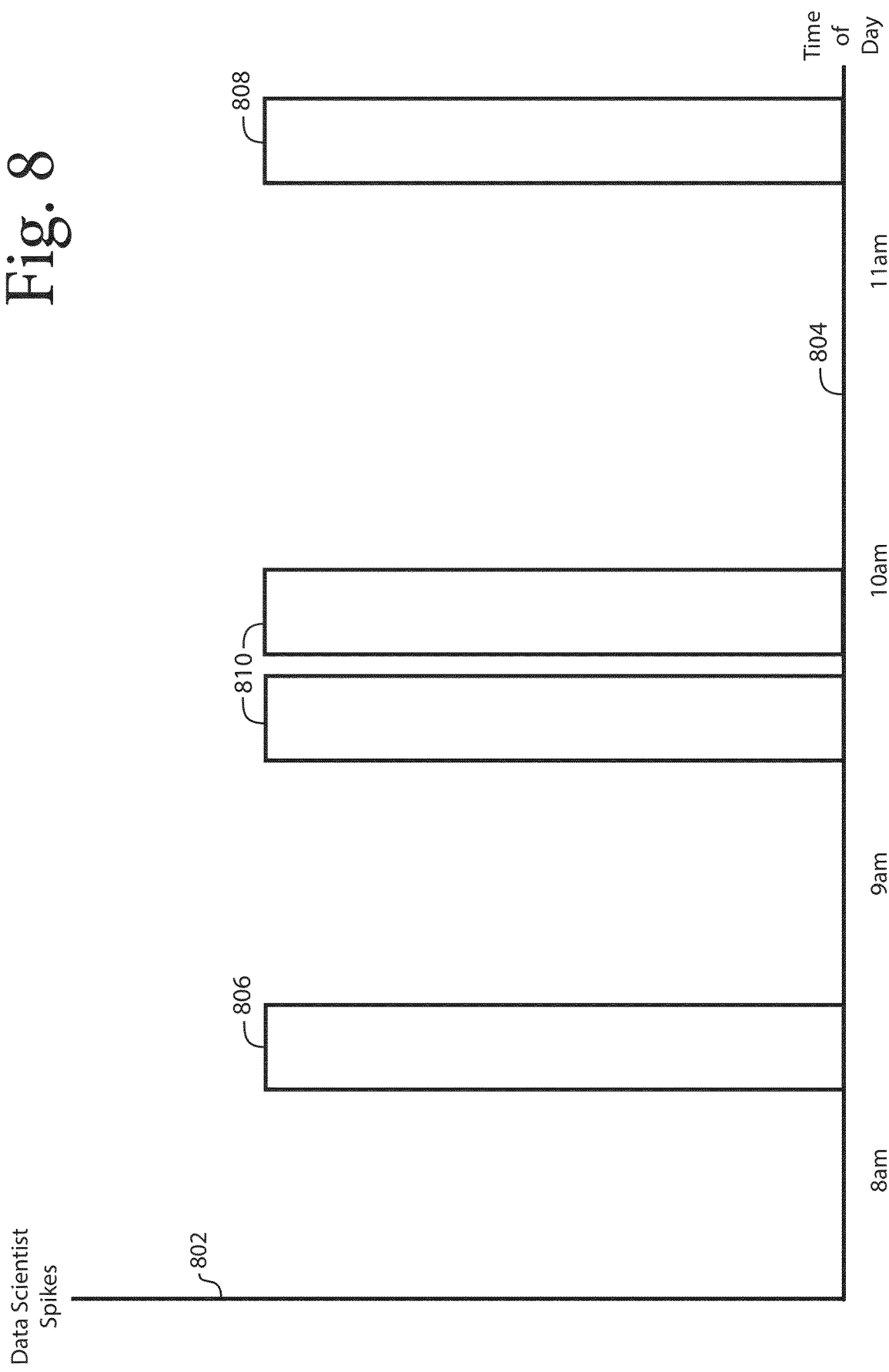
FIG. 8 illustrates an example of potential usage of a highly optimized enterprise data warehouse by a Data Scientist.

FIG. 8 illustrates an example of potential usage of a highly optimized enterprise data warehouse by a Data Scientist. Such usage is likely to be very different from the "Run The Business" usage illustrated in FIG. 7 and thus is not included in the "Run The Business" set of queries. The vertical axis 802 represents the Data Scientist usage and the horizontal axis 804 represents time. At any point in the day, a Data Scientist may run a single complex analytical query 806, 808 or a batch 810 thereof. These complex analytic queries can dramatically impact the operation of a highly optimized enterprise data warehouse.

One way to address this problem is by using an Ephemeral compute infrastructure. The problem with this is that ephemeral compute capabilities take time to initialize and disappear when not in use. This may result in several points during a day where the system does not have sufficient power to Run The Business and/or support Ad-Hoc Work depending upon how Workload Management rules are set up.

Dynamically Instantiated Complex Query Processing (ephemeral, or pulsed compute) allows for intensive "Citizen BI or Data Science" work that aims to improve the operation of the business over time. Such processing requirements are not constrained by production work because the Data Science or Research process operates at the speed and schedule of the Scientist's involved in the activity. However, it is also desired to avoid disrupting the finely tuned production system. The solutions described herein leverage various techniques to dynamically provide compute space or capacity for randomly initiated complex "Citizen BI or Data Science" queries.

Essentially, upon detection of an incoming query that does not fit the profile for "Run the Business" work (Tactical, Business Intelligence Reporting, ELT/ETL, etc.) the incoming query can be 'held' or 'aborted' while sufficient "Compute and IO" are calculated to satisfy the incoming query's needs. Such Compute and IO optionally can be dynamically created (CSP application program interface (API) or VMware spin-up) with subsequent inclusion into the system.

Within a Teradata VantageCloud Lake™ implementation it is possible to spin up compute (and its associated IO) dynamically by calling out to the Operational Command and Control infrastructure to instantiate and incorporate this dynamically deployed resource before releasing and directing this complex query to that compute for processing. Once this complex query has completed its work this dynamically deployed resource can either be decoupled from the main system (and optionally held in reserve for a short amount of time as a form of compute cache) or removed/deleted from the CSP environment without a restart or other disruption to the system's operation. Alternatively, based on a presumption that a sufficiently similar complex query maybe forthcoming as a Citizen BI developer or Data Scientist evaluates the results of a first or second complex query and issues subsequent similar queries in quick succession, with modified parameters, that are likely to require similar compute and IO resources, the compute optionally can be left in place for a short period of time.

VantageCloud Lake™, and similar dynamic compute cluster architectures, provide the ability to bring up Secondary Compute Clusters in a dynamic manner based upon the detection of an "Out of Bounds Query". This requires a "Query Detection" system embedded into the initial entry point to the database (within an enterprise Teradata System this would likely be the Gateway and or what Teradata refers to as the optimizer 320; within a VantageCloud Lake™ environment, the scheduler 110 might be the appropriate place to conduct this detection and automation). In either case, the ability to hold a query (as current workload management systems delay queries for various reasons) combined with a mechanism to reach out to any command-and-control mechanism that can spin up and incorporate compute and its associated IO capability into a running Database or Analytic system can allow these complex queries to be executed without disrupting the operation of a fully optimized "Run The Business" environment.

Figure 9:
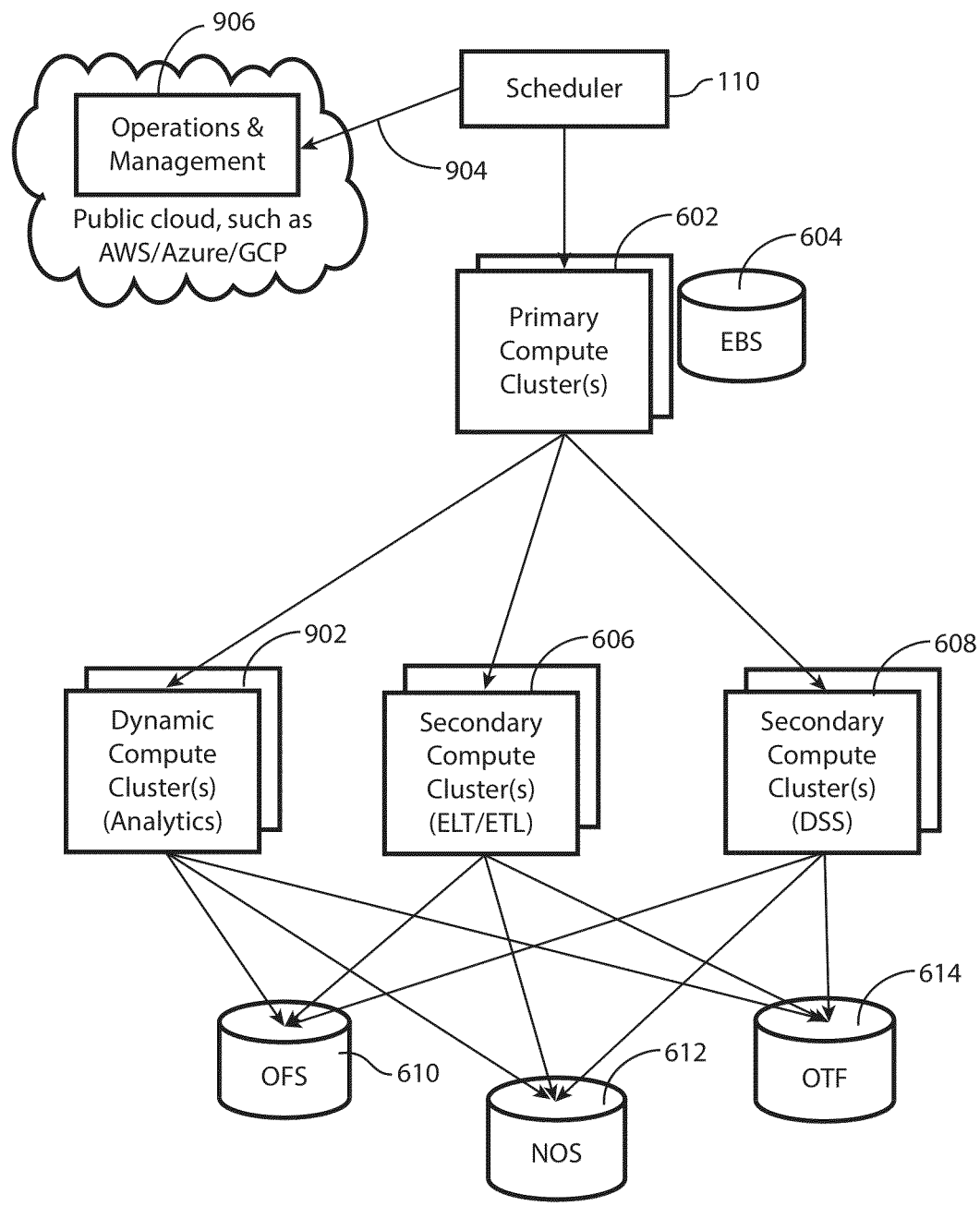
FIG. 9 illustrates an example of the "Run the Business" architecture extended to facilitate Dynamically Instantiated Complex Query Processing.

FIG. 9 illustrates an example of the "Run the Business" architecture extended to facilitate Dynamically Instantiated Complex Query Processing. The scheduler 110 may apply rules to direct work initially through a Primary Compute Cluster(s) 602, which may process Tactical work based off local or EBS storage 604. More complex queries may be routed to Secondary Compute Cluster(s) 606, 608 based on various rules directing ELT/ETL and DSS work as appropriate. Secondary Compute Cluster(s) 606, 608 typically work against different types of Object Stores (e.g., Object File System 610, Native Object System 612 and Open Table Format 614).

The scheduler 110, based upon its rules and the characteristics of the query (User Identity, SQL Text Size/Complexity, etc.), may decide to dynamically instantiate a dynamic compute cluster 902 of appropriate size and configuration. This would occur by the scheduler 110 initially holding the query and making an API call 904 to the Operations and Management component 906 of the Enterprise Data Warehouse that uses CSP (AWS, Azure, GCP, etc.) provided APIs to Dynamically Instantiate "Analytic" Compute and connect it into the realm of the Primary Compute Cluster(s) 602. Upon completion of that workflow, the scheduler 110 releases the query to the Primary Compute Cluster(s) 602 where it can be directed to the Dynamic Compute Cluster(s) 902 for processing. As with Secondary Compute Cluster(s) 606, 608, the Dynamic Compute Cluster(s) 902 works against different types of Object Stores (Object File System 610, Native Object System 612 and Open Table Format 614).

Figure 10:
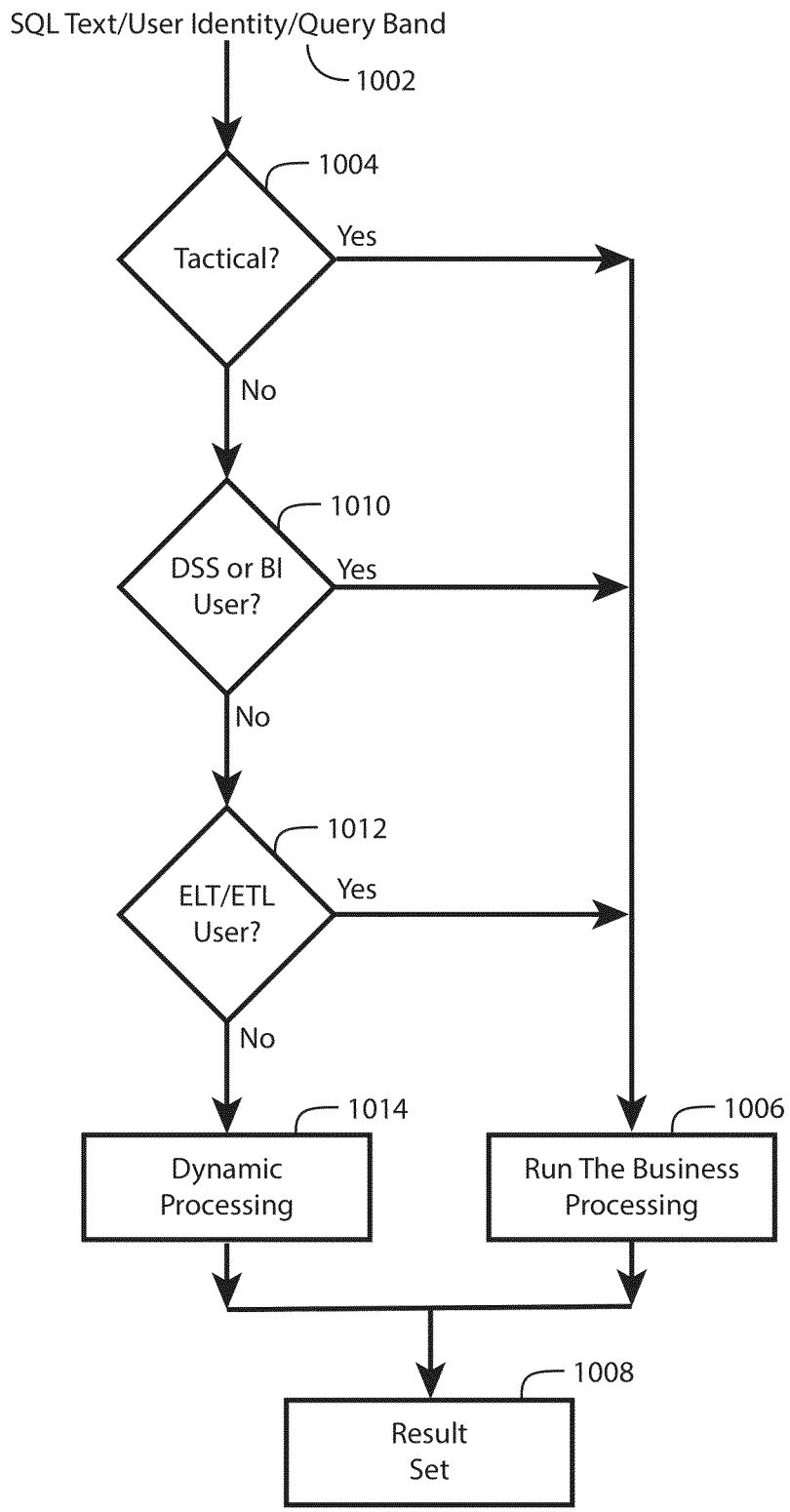
FIG. 10 illustrates a simplified process for determining whether a query is to be processed by a dynamically created compute cluster or by the compute clusters available in the "Run the Business" architecture.

FIG. 10 illustrates a simplified process for determining whether a query is to be processed by a dynamically created compute cluster or by the compute clusters available in the "Run The Business" architecture. An incoming query 1002 is inspected, using a Query Profile Detection System, such as Teradata Active System Management (TASM), looking at elements such as the SQL Text volume and complexity, the identity of the User posting the query, or other indicators such as Teradata Query Band information [4]. The scheduler 110 may inspect these elements in sequence with a test for whether a query may be Tactical in nature 1004 applied first to get that query processed as quickly as possible. Such a test might look for very short or very directed SQL Text (with a highly selective set of predicate terms such as Select, Projection, Join and/or Aggregation terms). Such a tactical query might also be called out directly by Query Band Key/Value [4] that explicitly indicates the Tactical Nature of the query explicitly calling for expeditated processing. If the query is determined to be tactical ("Yes" branch from block 1004), "Run The Business" processing 1006 is performed, using the Primary Compute Cluster(s) 602 or the Secondary Compute Cluster(s) 606, 608, producing a result set 1008.

If a query is not Tactical ("No" branch from block 1004), the query would be tested to determine if it is a Decision Support (DSS) or Business Report (BI) query 1010, as it is desired to get those results to users promptly. Again, the absolute User Identity optionally can be tested and/or a Query Band key/value version [4] that reflects a group of DSS Users working through the same BI tool. If the query is determined to satisfy this test ("Yes" branch from block 1010), "Run The Business" processing 1006 is performed, using the Primary Compute Cluster(s) 602 or the Secondary Compute Cluster(s) 606, 608, producing a result set 1008.

If the query is determined to not be a DSS or BI query ("No" branch from block 1010), the system may test for an ELT/ETL user 1012 similarly using actual User Identity and/or a Query Band key/value version [4] that reflects a group of ELT/ETL Users working through the same ELT/ETL tool. If the query is determined to satisfy this test ("Yes" branch from block 1012), "Run The Business" processing 1006 is performed, using the Primary Compute Cluster(s) 602 or the Secondary Compute Cluster(s) 606, 608, producing a result set 1008.

If the query fails all of the query type tests 1004, 1010, 1012, and any other query type tests not listed, Dynamic Processing 1014 is applied as described above in connection with FIG. 9, resulting in the result set 1008.

Figures 11A, 11B:
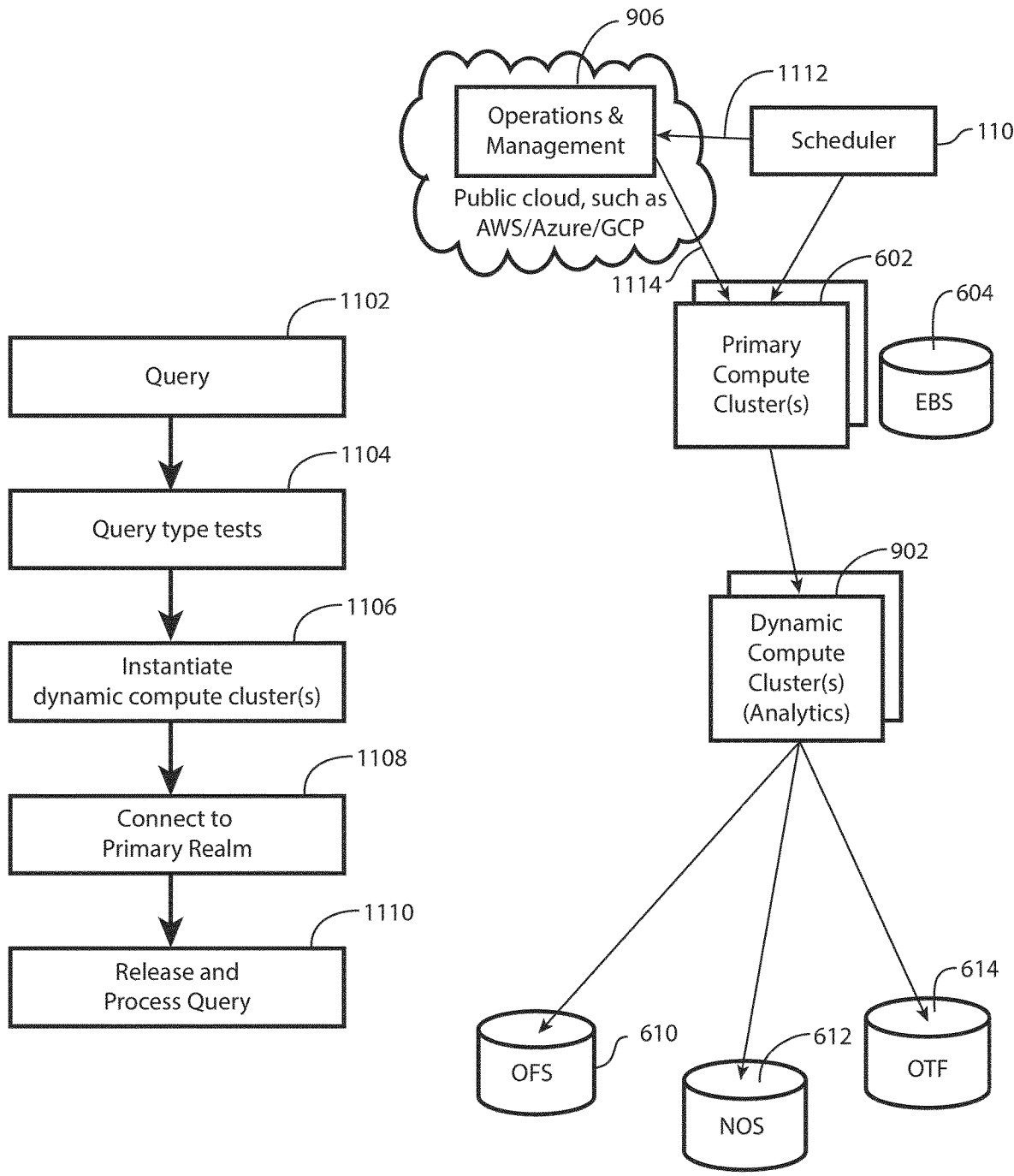
FIGS. 11A and 11B illustrate a Workflow and Architecture for the Dynamic Instantiation of Specialized Analytic Compute capability in support of the Data Scientist workloads illustrated in FIG. 8.

FIGS. 11A and 11B illustrate a Workflow and Architecture for the Dynamic Instantiation of Specialized Analytic Compute capability in support of the Data Scientist workloads illustrated in FIG. 8. As shown, the scheduler 110 receives the incoming query 1102 and applies the query type tests illustrated and described in connection with FIG. 10 1104. Assuming that the query type tests indicate that the incoming query is not in the Run The Business category, the system dynamically instantiates one or more Dynamic Compute Cluster(s) 1106 to satisfy the analytic requirements of the query while minimizing the impact upon the highly optimized "Run The Business" processes (FIG. 7) and Architecture (FIG. 6). This process is initiated by the scheduler 110 via an API call 1112 to the system's Operations and Management system 906, which will use the APIs of the underlying Cloud Service Providers (CSPs) of AWS/Azure/GCP/etc. to instantiate the appropriate amount of Dynamic Compute Cluster(s) 902 to handle the analytic query in question. Simply having the Compute available is not sufficient as it needs to be connected into the system; hence workflow component "Connect to Primary Realm" 1108 is used to cause this to occur. A command optionally can be included in the response to the Operations and Management API request 1112 placing the onus on the scheduler 110 to inform the Primary Compute Cluster(s) 602 of the existence of the Dynamic Compute Cluster(s) 902 that will ultimately process the incoming query. Alternatively, Operations and Management 906 may go directly to the Primary Compute Cluster(s) 602 over a SQL or API interface 1114. Ultimately the scheduler 110 needs to be signaled to release and allow Dynamic Compute Cluster(s) 902 processing of this complex query via workflow 1110. Once released, there may be minimal "dictionary" access to Primary/EBS Storage 604 and as with FIG. 9 above, this Dynamic Compute Cluster(s) works against different types of Object Stores (Object File System 610, Native Object System 612, and Open Table Format 614).

An alternative implementation might be similar to an Enterprise Application Database Connection Pool [1], where multiple Compute and IO clusters are maintained awaiting work as a "Capacity Pool." The majority of this will go to satisfying Single to Multi-second/Minute DSS queries as they come in (Sub Second Tactical work must be satisfied with the shortest path from detection to response and requires an always-on physical capability). Typically, such compute, if intelligentially managed throughout the workday, will be appropriately and efficiently managed. However, by tapping into this "Capacity Pool" it is possible to briefly delay an incoming "Complex Query" and assign pre-allocated resources to it. The result is the same as the previous description in that "Complex Queries" issued by specific Citizen BI Researchers and Data Scientists are satisfied in a timely and cost-efficient manner without causing Service Level Agreement (SLA) harm to the fully optimized "Run the Business" Work.

Figure 12:
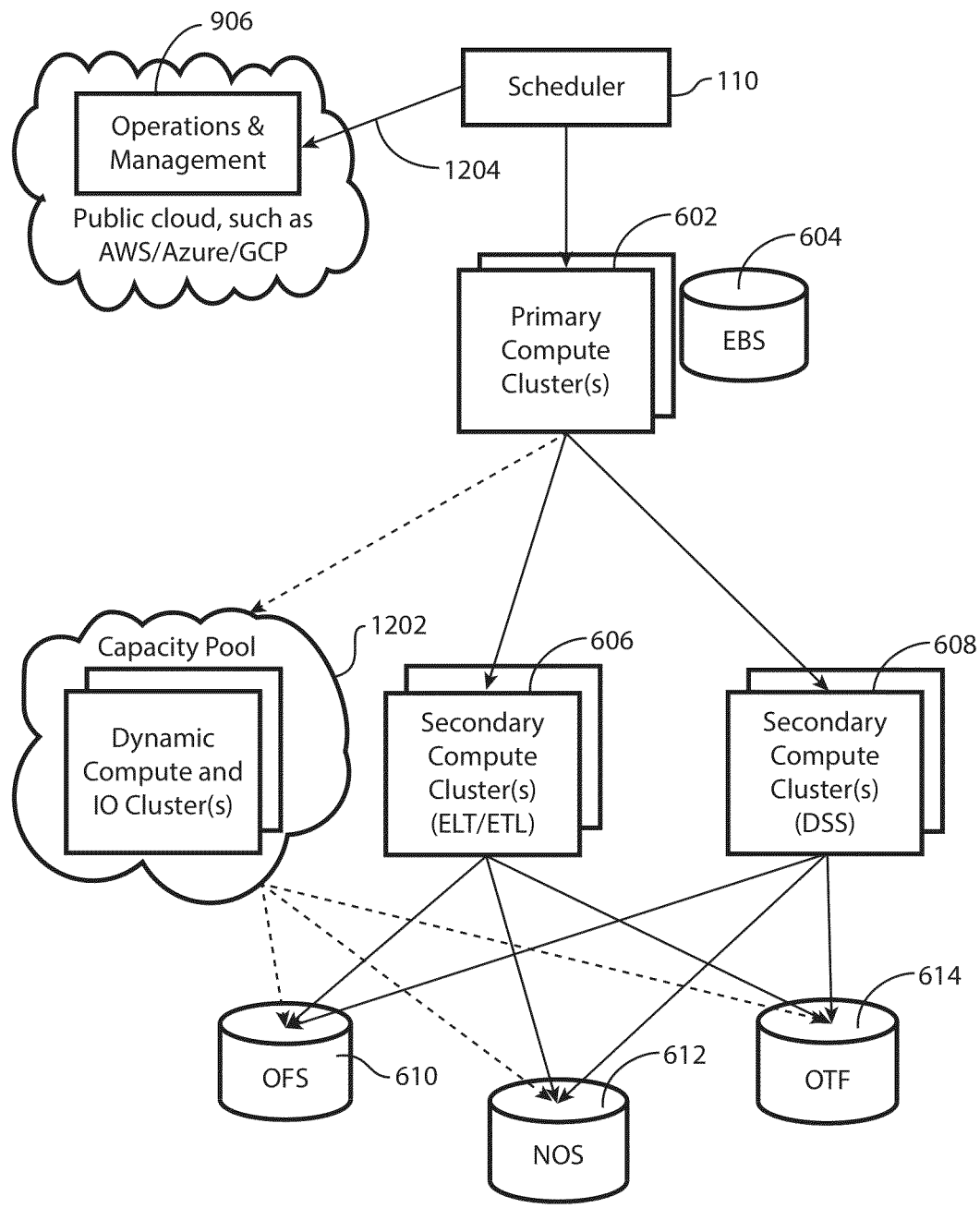
FIG. 12 illustrates an implementation using a capacity pool of dynamic compute and IO clusters.

FIG. 12 illustrates an implementation using a capacity pool of dynamic compute and IO clusters. As can be seen, a capacity pool of compute and IO clusters 1202 that is available to the Primary Compute Cluster(s) 602 on an as-needed basis by way of API calls 1204 from the scheduler to the Operations and Management component 906 of the Enterprise Data Warehouse. This "as-needed" basis is indicated by the dashed line from the Primary Compute Cluster(s) 602 to the capacity pool 1202. Similarly, the capacity pool 1202 has as-needed access to the OFS 610, the NOS 612, and the OTF 614, as indicated by the dashed lines from the capacity pool 1202 to those storage elements.

A further implementation might involve identifying initial query steps that are focused on gathering initial or "spool" data based on the query text (i.e., predicate terms, SELECT clause terms, or features specified in the query) potentially pre-loading this into a shared location such as Object Storage. In parallel to these "Data Preparation" steps the actual compute that will be used to conduct the analytic steps can be prepared according to one or more of the techniques mentioned above. This would require a deeper integration into the database Optimizer and Query Planner to utilize standard Compute/IO to acquire and "spool" data while specialized "Analytics" Compute is prepared in parallel. Where this type of Compute might be more expensive (higher power CPUs, specialist graphics processing units (GPU) or analytic hardware) minimizing the amount of time that such Compute is up and being used becomes all the more important. A shared "Spool" area stored in something like Object Storage means it is possible to cheaply prepare data for easy access from expensive Compute nodes for efficient consumption into the more complex and expensive analytic processing. For example, in Teradata systems, a spool is a workspace used to store temporary and final result steps that is only used temporarily and is released automatically when it is no longer needed or automatically at the termination of the session for which the spool was created.

Figure 13:
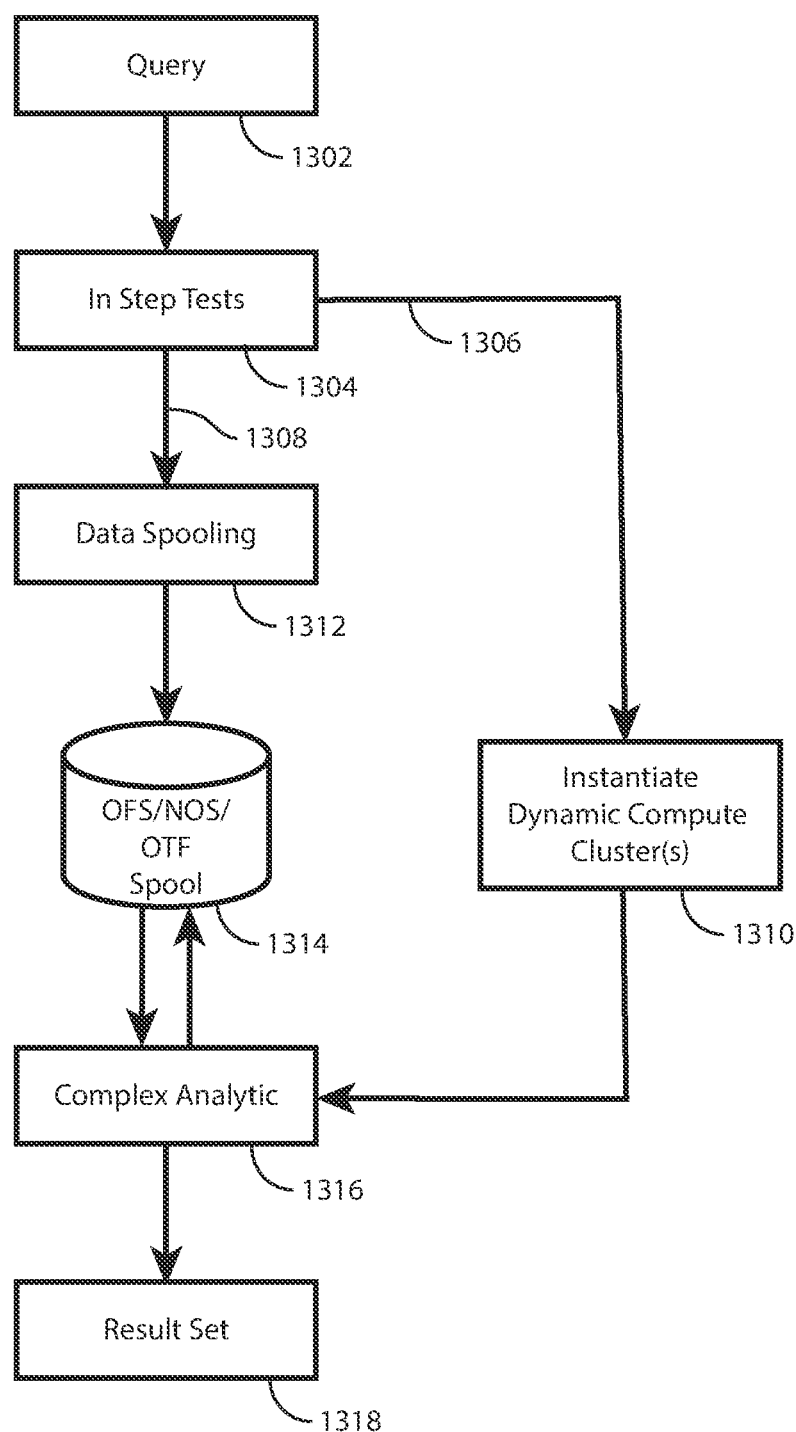
FIG. 13 illustrates an "In Step" Dynamic Compute Instantiation Workflow.

FIG. 13 illustrates an "In Step" Dynamic Compute Instantiation Workflow. A query 1302 is received. "In Step" Tests 1304 are performed on the query 1302, which indicate that dynamically instantiating compute for the analytic part of the query is advisable. An example of such a query would be one that performs any kind of artificial intelligence ("AI") and/or machine learning ("ML") application (such as video, audio, text, or language translation), or other processing that requires specialized hardware, such as graphics processing units ("GPUs"), tensor processing units ("TPUs"), advanced reduced instruction set computer machines ("ARMs"), accelerator hardware, etc. The advisability of dynamically instantiating compute for the analytical part of the query causes a processing split to occur, resulting in one or more analytical processing paths 1306 (only one is illustrated) and one or more data spooling paths 1308 (only one is illustrated).

The analytical processing paths 1306 result in the instantiation of one or more Dynamic Compute Cluster(s) 1310, although it is possible that the analytical processing path 1306 optionally can be accomplished by the Primary Compute Cluster(s) 602 or one or more of the Secondary Compute Cluster(s) 606, 608.

The data spooling paths 1308 includes data spooling 1312, which may be accomplished by the Primary Compute Cluster(s) 602 or one or more of the Secondary Compute Cluster(s) 606, 608. The data spooling 1312 produces an OFS/NOS/OTF Spool based, for example, upon a Where clause (data selection) in the query 1302.

In the meantime, while spool 1314 is being created, the Dynamic Compute Cluster is being instantiated and becomes available to perform the Complex Analytic 1316, accessing the spool 1314 as needed, to execute the query's required analytic steps before returning a Result Set 1318.

Figure 14:
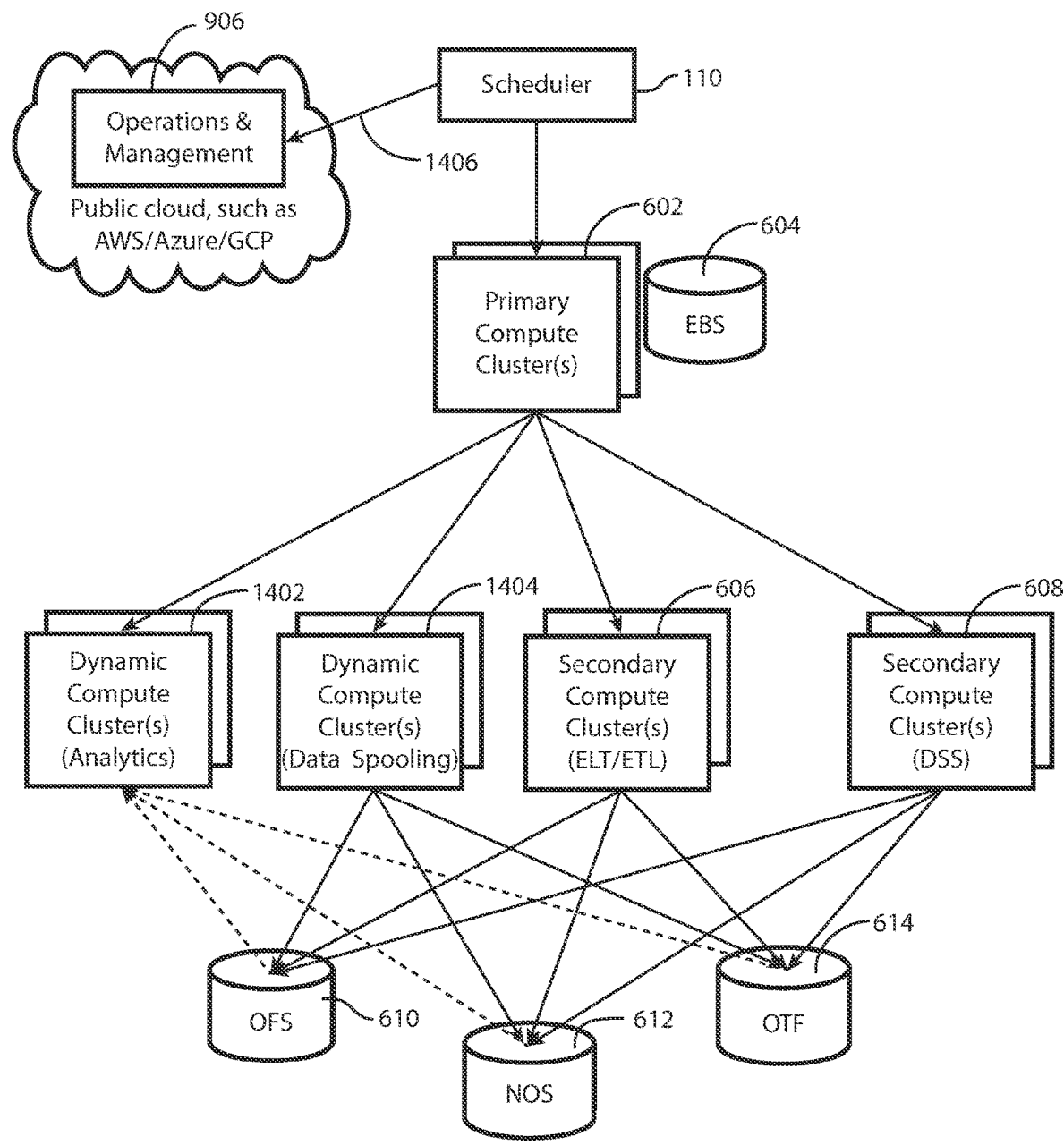
FIG. 14 illustrates an architecture for a system with an analytical processing path and a separate data spooling processing path.

FIG. 14 illustrates an architecture for a system with an analytical processing path and a separate data spooling processing path. As can be seen, a Dynamic Compute Cluster(s) 1402 has been instantiated to handle the analytics of processing a query and a Dynamic Compute Cluster(s) 1404 has been instantiated to handle data spooling required in processing the query, as the result of an API call 1406 to the Operations and Management component 906 of the Enterprise Data Warehouse. The Dynamic Compute Cluster(s) 1404 is shown building the spool on the OFS 610, NOS 612, and/or OTF 614 and the Dynamic Compute Cluster(s) 1402 accessing the spool at a later time, as indicated by the dashed lines. It will be understood that the functions of the Dynamic Compute Cluster(s) 1402 and the Dynamic Compute Cluster(s) 1404 optionally can be accomplished by the Primary Compute Cluster(s) 602 or the Secondary Compute Cluster(s) 606, 608.

Further examples consistent with the present teaching are set out in the following numbered clauses.

Clause 1. A method comprising:
executing a plurality of processes on a plurality of compute groups,
wherein each compute group comprises one or more compute clusters,
wherein each compute cluster comprises one or more nodes,
wherein each node comprises at least one computer processor and a memory,
wherein the plurality of processes store data on a data storage;
a database system executing as at least one of the plurality of processes;
the database system configured to issue executable steps to at least one of the processes executing as part of the database system,
receiving a query;
determining that the query does not fit a profile for a run-the-business set of queries, where the profile for the run-the-business set of queries excludes queries that are not routine parts of running a business and that do not require priority processing; and
executing the query with a dynamically-created compute capacity that is not part of a compute capacity used to run the run-the-business set of queries.

Clause 2. The method of clause 1 where the dynamically-created compute capacity exists when the query is received.

Clause 3. The method of clause 1 where the dynamically-created compute capacity exists as part of a capacity pool when the query is received.

Clause 4. The method of clause 1 where the dynamically-created compute capacity is instantiated at the time it is determined to run the dynamically-created compute capability.

Clause 5. The method of any of the preceding clauses where determining that the query is not a query that is included in the run-the-business set of queries includes considering one or more of:
if the query is tactical, in which case the query is considered to be in the run-the-business set of queries,
if the query has query metadata (query band) that explicitly indicates the query is tactical, in which case the query is considered to be in the run-the-business set of queries,
if the query is a decision support query or a business report query, in which case the query is considered to be in the run-the-business set of queries, and
if the query is an export, load, and transform query or an export, transform, load query, in which case the query is considered to be in the run-the-business set of queries.

Clause 6. The method of any of the preceding clauses where executing the query with a dynamically-created compute capacity includes identifying steps to be performed in executing the query and identifying a data-gathering subset of the steps that are focused on gathering data and a compute subset of the steps that perform analysis of the gathered data and:
- executing the data-gathering subset of the steps on a first dynamically-created compute capacity, and,
- executing the compute subset of the steps on a second compute capacity.

Clause 7. The method of clause 6 wherein the second compute capability is a second dynamically-created compute capacity.

Clause 8. A non-transitory computer-readable tangible medium, on which is recorded a computer program, the computer program comprising executable instructions, that, when executed, perform a method comprising:
- executing a plurality of processes on a plurality of compute groups,
  - wherein each compute group comprises one or more compute clusters,
  - wherein each compute cluster comprises one or more nodes,
  - wherein each node comprises at least one computer processor and a memory,
  - wherein the plurality of processes store data on a data storage;
- a database system executing as at least one of the plurality of processes;
- the database system configured to issue executable steps to at least one of the processes executing as part of the database system,
- receiving a query;
- determining that the query does not fit a profile for a run-the-business set of queries, where the profile for the run-the-business set of queries excludes queries that are not routine parts of running a business and that do not require priority processing; and
- executing the query with a dynamically-created compute capacity that is not part of a compute capacity used to run the run-the-business set of queries.

Clause 9. The method of clause 8 where the dynamically-created compute capacity exists when the query is received.

Clause 10. The method of clause 8 where the dynamically-created compute capacity exists as part of a capacity pool when the query is received.

Clause 11. The method of clause 8 where the dynamically-created compute capacity is instantiated at the time it is determined to run the dynamically-created compute capability.

Clause 12. The method of any of clauses 8-11 where determining that the query is not a query that is included in the run-the-business set of queries includes considering one or more of:
- if the query is tactical, in which case the query is considered to be in the run-the-business set of queries,
- if the query has query metadata (query band) that explicitly indicates the query is tactical, in which case the query is considered to be in the run-the-business set of queries,
- if the query is a decision support query or a business report query, in which case the query is considered to be in the run-the-business set of queries, and
- if the query is an export, load, and transform query or an export, transform, load query, in which case the query is considered to be in the run-the-business set of queries.

Clause 13. The method of any of clauses 8-12 where executing the query with a dynamically-created compute capacity includes identifying steps to be performed in executing the query and identifying a data-gathering subset of the steps that are focused on gathering data and a compute subset of the steps that perform analysis of the gathered data and:
- executing the data-gathering subset of the steps on a first dynamically-created compute capacity, and,
- executing the compute subset of the steps on a second compute capacity.

Clause 14. The method of clause 13 wherein the second compute capability is a second dynamically-created compute capacity.

Clause 15. An article of manufacture comprising:
- a system executing a plurality of processes on a plurality of compute groups,
  - wherein each compute group comprises one or more compute clusters,
  - wherein each compute cluster comprises one or more nodes,
  - wherein each node comprises at least one computer processor and a memory,
  - wherein the plurality of processes store data on a data storage;
- a database system executing as at least one of the plurality of processes;
- the database system configured to issue executable steps to at least one of the processes executing as part of the database system,
- the database system receiving a query;
- the database system determining that the query does not fit a profile for a run-the-business set of queries, where the profile for the run-the-business set of queries excludes queries that are not routine parts of running a business and that do not require priority processing; and
- the database system executing the query with a dynamically-created compute capacity that is not part of a compute capacity used to run the run-the-business set of queries.

Clause 16. The article of manufacture of clause 15 where the dynamically-created compute capacity exists when the query is received.

Clause 17. The article of manufacture of clause 15 where the dynamically-created compute capacity exists as part of a capacity pool when the query is received.

Clause 18. The article of manufacture of clause 15 where the dynamically-created compute capacity is instantiated at the time it is determined to run the dynamically-created compute capability.

Clause 19. The article of manufacture of any of clauses 15-18 where determining that the query is not a query that is included in the run-the-business set of queries includes considering one or more of:
- if the query is tactical, in which case the query is considered to be in the run-the-business set of queries,
- if the query has query metadata (query band) that explicitly indicates the query is tactical, in which case the query is considered to be in the run-the-business set of queries, if the query is a decision support query or a business report query, in which case the query is considered to be in the run-the-business set of queries, and if the query is an export, load, and transform query or an export, transform, load query, in which case the query is considered to be in the run-the-business set of queries.

Clause 20. The article of manufacture of any of clauses 15-19 where executing the query with a dynamically-created compute capacity includes identifying steps to be performed in executing the query and identifying a data-gathering subset of the steps that are focused on gathering data and a compute subset of the steps that perform analysis of the gathered data and:

executing the data-gathering subset of the steps on a first dynamically-created compute capacity, and, executing the compute subset of the steps on a second compute capacity.

The operations of the flow diagrams are described with references to the systems/apparatus shown in the block diagrams. However, it should be understood that the operations of the flow diagrams optionally can be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Wikipedia post on "Connection Pool", located at en.wikipedia.org/wiki/Connection_pool
[2] U.S. Pat. No. 9,805,121B2
[3] U.S. Pat. No. 10,366,057
[4] docs.teradata.com/r/Teradata-Studio-IDE-Plug-in-User-Guide/March-2017/Getting-Started-With-IDE/Teradata-Libraries/About-Query-Banding

What is claimed is:

1. A method comprising:

executing a plurality of processes on a plurality of compute groups,
wherein each compute group comprises one or more compute clusters,
wherein each compute cluster comprises one or more nodes,
wherein each node comprises at least one computer processor and a memory,
wherein the plurality of processes store data on a data storage;
a database system executing as at least one of the plurality of processes;
the database system configured to issue executable steps to at least one of the processes executing as part of the database system,
receiving a query;
determining that the query does not fit a profile for a run-the-business set of queries, where the profile for the run-the-business set of queries excludes queries that are not routine parts of running a business and that do not require priority processing; and
executing the query with a dynamically-created compute capacity that is not part of a compute capacity used to run the run-the-business set of queries.

2. The method of claim 1 where the dynamically-created compute capacity exists when the query is received.

3. The method of claim 1 where the dynamically-created compute capacity exists as part of a capacity pool when the query is received.

4. The method of claim 1 where the dynamically-created compute capacity is instantiated at the time it is determined to run the dynamically-created compute capability.

5. The method of claim 1 where determining that the query is not a query that is included in the run-the-business set of queries includes considering one or more of:

if the query is tactical, in which case the query is considered to be in the run-the-business set of queries, if the query has query metadata (query band) that explicitly indicates the query is tactical, in which case the query is considered to be in the run-the-business set of queries, if the query is a decision support query or a business report query, in which case the query is considered to be in the run-the-business set of queries, and if the query is an export, load, and transform query or an export, transform, load query, in which case the query is considered to be in the run-the-business set of queries.

6. The method of claim 1 where executing the query with a dynamically-created compute capacity includes identifying steps to be performed in executing the query and identifying a data-gathering subset of the steps that are focused on gathering data and a compute subset of the steps that perform analysis of the gathered data and:

executing the data-gathering subset of the steps on a first dynamically-created compute capacity, and, executing the compute subset of the steps on a second compute capacity.

7. The method of claim 6 wherein the second compute capability is a second dynamically-created compute capacity.

8. A non-transitory computer-readable tangible medium, on which is recorded a computer program, the computer program comprising executable instructions, that, when executed, perform a method comprising:

executing a plurality of processes on a plurality of compute groups,
wherein each compute group comprises one or more compute clusters,
wherein each compute cluster comprises one or more nodes,
wherein each node comprises at least one computer processor and a memory,
wherein the plurality of processes store data on a data storage;
a database system executing as at least one of the plurality of processes;
the database system configured to issue executable steps to at least one of the processes executing as part of the database system,
receiving a query;

determining that the query does not fit a profile for a run-the-business set of queries, where the profile for the run-the-business set of queries excludes queries that are not routine parts of running a business and that do not require priority processing; and executing the query with a dynamically-created compute capacity that is not part of a compute capacity used to run the run-the-business set of queries.

9. The non-transitory computer-readable tangible medium of claim 8 where the dynamically-created compute capacity exists when the query is received.

10. The non-transitory computer-readable tangible medium of claim 8 where the dynamically-created compute capacity exists as part of a capacity pool when the query is received.

11. The non-transitory computer-readable tangible medium of claim 8 where the dynamically-created compute capacity is instantiated at the time it is determined to run the dynamically-created compute capability.

12. The non-transitory computer-readable tangible medium of claim 8 where determining that the query is not a query that is included in the run-the-business set of queries includes considering one or more of:

if the query is tactical, in which case the query is considered to be in the run-the-business set of queries, if the query has query metadata (query band) that explicitly indicates the query is tactical, in which case the query is considered to be in the run-the-business set of queries, if the query is a decision support query or a business report query, in which case the query is considered to be in the run-the-business set of queries, and if the query is an export, load, and transform query or an export, transform, load query, in which case the query is considered to be in the run-the-business set of queries.

13. The non-transitory computer-readable tangible medium of claim 8 where executing the query with a dynamically-created compute capacity includes identifying steps to be performed in executing the query and identifying a data-gathering subset of the steps that are focused on gathering data and a compute subset of the steps that perform analysis of the gathered data and:

executing the data-gathering subset of the steps on a first dynamically-created compute capacity, and, executing the compute subset of the steps on a second compute capacity.

14. The non-transitory computer-readable tangible medium of claim 13 wherein the second compute capability is a second dynamically-created compute capacity.

15. An article of manufacture comprising:
a system executing a plurality of processes on a plurality of compute groups,
wherein each compute group comprises one or more compute clusters,
wherein each compute cluster comprises one or more nodes,
wherein each node comprises at least one computer processor and a memory,
wherein the plurality of processes store data on a data storage;
a database system executing as at least one of the plurality of processes;
the database system configured to issue executable steps to at least one of the processes executing as part of the database system,
the database system receiving a query;
the database system determining that the query does not fit a profile for a run-the-business set of queries, where the profile for the run-the-business set of queries excludes queries that are not routine parts of running a business and that do not require priority processing; and
the database system executing the query with a dynamically-created compute capacity that is not part of a compute capacity used to run the run-the-business set of queries.

16. The article of manufacture of claim 15 where the dynamically-created compute capacity exists when the query is received.

17. The article of manufacture of claim 15 where the dynamically-created compute capacity exists as part of a capacity pool when the query is received.

18. The article of manufacture of claim 15 where the dynamically-created compute capacity is instantiated at the time it is determined to run the dynamically-created compute capability.

19. The article of manufacture of claim 15 where determining that the query is not a query that is included in the run-the-business set of queries includes considering one or more of:

if the query is tactical, in which case the query is considered to be in the run-the-business set of queries, if the query has query metadata (query band) that explicitly indicates the query is tactical, in which case the query is considered to be in the run-the-business set of queries, if the query is a decision support query or a business report query, in which case the query is considered to be in the run-the-business set of queries, and if the query is an export, load, and transform query or an export, transform, load query, in which case the query is considered to be in the run-the-business set of queries.

20. The article of manufacture of claim 15 where executing the query with a dynamically-created compute capacity includes identifying steps to be performed in executing the query and identifying a data-gathering subset of the steps that are focused on gathering data and a compute subset of the steps that perform analysis of the gathered data and:

executing the data-gathering subset of the steps on a first dynamically-created compute capacity, and, executing the compute subset of the steps on a second compute capacity.

\* \* \* \* \*